(12) United States Patent
Nasu

(10) Patent No.: US 10,587,845 B2
(45) Date of Patent: Mar. 10, 2020

(54) INFORMATION PROCESSING SYSTEM

(71) Applicant: NEC Corporation, Tokyo (JP)

(72) Inventor: Yasuyuki Nasu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/425,338

(22) Filed: May 29, 2019

(65) Prior Publication Data
US 2019/0373218 A1 Dec. 5, 2019

(30) Foreign Application Priority Data
May 30, 2018 (JP) .................. 2018-103477

(51) Int. Cl.
H04N 7/18 (2006.01)

(52) U.S. Cl.
CPC .................. H04N 7/181 (2013.01)

(58) Field of Classification Search
USPC ........ 348/143, 148, 142, 125, 837; 340/938, 340/988, 995.17
See application file for complete search history.

(56) References Cited

U.S. PATENT DOCUMENTS

| | | | | |
|---|---|---|---|---|
| 2010/0302371 A1* | 12/2010 | Abrams | ............... | G08G 1/0175 348/149 |
| 2014/0320645 A1* | 10/2014 | Schmitz | ................. | G08G 1/054 348/142 |
| 2015/0281568 A1* | 10/2015 | Kamada | ................... | H04N 5/91 348/207.1 |
| 2015/0307048 A1* | 10/2015 | Santora | .................. | G08G 1/205 348/148 |
| 2016/0009225 A1* | 1/2016 | Watanabe | ............... | B60R 1/002 348/148 |
| 2016/0152211 A1* | 6/2016 | Owens | .................. | B60R 25/102 348/36 |
| 2016/0379350 A1* | 12/2016 | Matsui | ..................... | B60Q 1/44 348/125 |
| 2017/0166131 A1* | 6/2017 | Oba | .......................... | B60R 1/00 |
| 2018/0343373 A1* | 11/2018 | Satou | ................... | H04N 5/2353 |
| 2019/0026959 A1* | 1/2019 | Wu | ........................ | G07B 15/063 |
| 2019/0122553 A1* | 4/2019 | Sakuma | ................. | G08G 1/143 |

FOREIGN PATENT DOCUMENTS

JP 2003-295951 A 10/2003

* cited by examiner

Primary Examiner — Jefferey F Harold
Assistant Examiner — Mustafizur Rahman
(74) Attorney, Agent, or Firm — Sughrue Mion, PLLC

(57) ABSTRACT

An information processing system of the present invention includes: an acquiring unit configured to acquire identification information for identifying a moving object present in a shot image based on the shot image; a specifying unit configured to specify position information representing a position of the moving object present in the shot image based on the shot image; and an estimating unit configured to estimate a position of the moving object based on the identification information and the position information.

12 Claims, 5 Drawing Sheets

INFORMATION PROCESSING SYSTEM

INCORPORATION BY REFERENCE

This application is based upon and claims the benefit of priority from Japanese patent application No. 2018-103477, filed on May 30, 2018, the disclosure of which is incorporated herein in its entirety by reference.

TECHNICAL FIELD

The present invention relates to an information processing system, an information processing device, a program, and an information processing method.

BACKGROUND ART

In recent years, an autonomous traveling vehicle that autonomously travels is used in various situations. For example, an autonomous mobile robot actively works, such as moves on a set route in a factory to carry a package, or moves on a set route to provide security. It is important for such a moving object to recognize its own position so as to move on an appropriate route.

In order for a moving object to recognize its own position as described above, for example, a camera or a sensor is mounted on the moving object. Moreover, for example, a camera is fixedly placed not on a moving object but in a predetermined place and the position of an autonomous moving object is determined based on a video from the camera as described in Patent Document 1. According to the technique of Patent Document 1, a moving object does not need to be equipped with sensors such as cameras, so that the equipment cost can be saved.

Patent Document 1: Japanese Unexamined Patent Application Publication No. JP-A 2003-295951

However, the technique described above cannot clarify correspondence between a moving object shown in an image and a moving object that is actually moving. Therefore, it is difficult to more accurately specify the position of a moving object.

SUMMARY OF THE INVENTION

An object of the present invention is to solve the above-mentioned problem that it is difficult to more accurately specify the position of a moving object at low cost.

An information processing system as an aspect of the present invention includes: an acquiring unit configured to acquire identification information for identifying a moving object present in a shot image based on the shot image; a specifying unit configured to specify position information representing a position of the moving object present in the shot image based on the shot image; and an estimating unit configured to estimate a position of the moving object based on the identification information and the position information.

Further, an information processing device as another aspect of the present invention includes: an acquiring unit configured to acquire identification information for identifying a moving object present in a shot image based on the shot image; a specifying unit configured to specify position information representing a position of the moving object present in the shot image based on the shot image; and a transmitting unit configured to transmit the acquired identification information and the specified position information to surroundings in association with each other so that the moving object can receive.

Further, a non-transitory computer-readable medium for storing a program as another aspect of the present invention includes instructions for causing an information processing device to realize: an acquiring unit configured to acquire identification information for identifying a moving object present in a shot image based on the shot image; a specifying unit configured to specify position information representing a position of the moving object present in the shot image based on the shot image; and a transmitting unit configured to transmit the acquired identification information and the specified position information to surroundings in association with each other so that the moving object can receive.

Further, an information processing method as another aspect of the present invention includes: in an information processing device, based on a shot image, acquiring identification information for identifying a moving object present in the shot image, and specifying position information representing a position of the moving object present in the shot image; and in the moving object, estimating a position of the moving object based on the identification information and the position information.

With the configurations as described above, the present invention makes it possible to more accurately specify the position of a moving object at low cost.

EXAMPLE EMBODIMENT

First Example Embodiment

Figure 1:
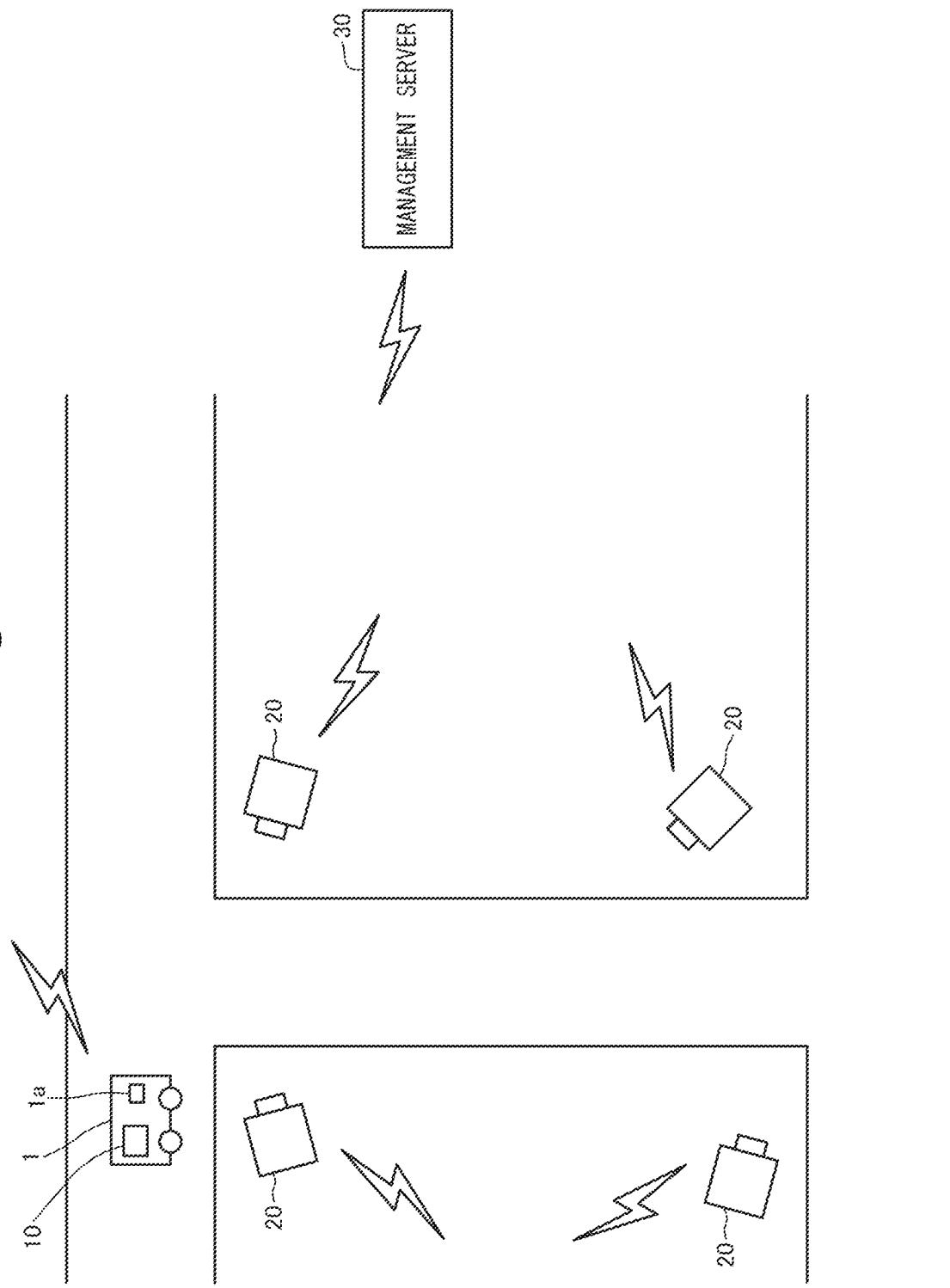
FIG. 1 is a schematic diagram showing an entire configuration of an information processing system according to a first example embodiment of the present invention.
Figure 2:
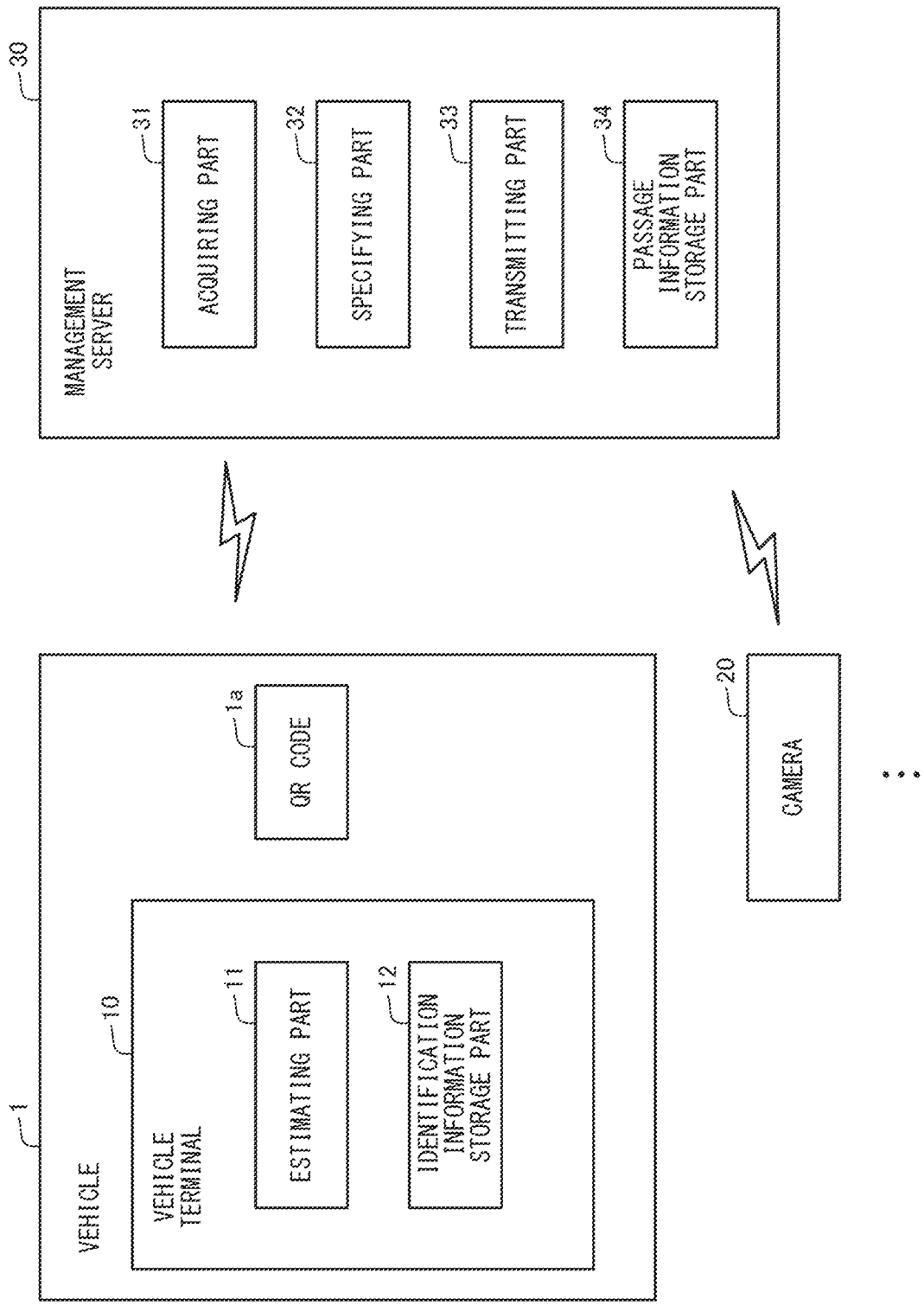
FIG. 2 is a block diagram showing the configuration of the information processing system disclosed in FIG. 1.
Figure 3:
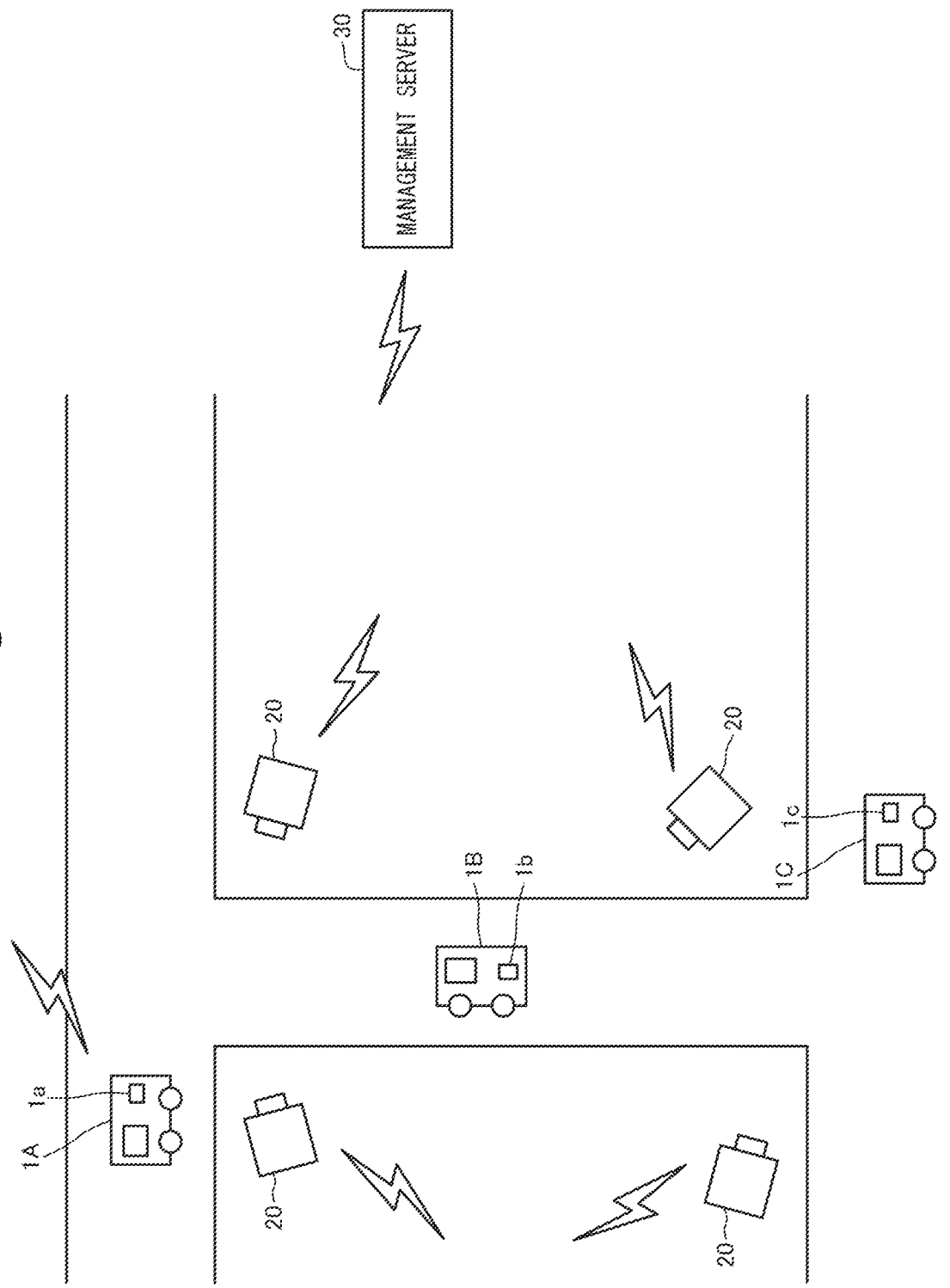
FIG. 3 is a diagram showing the traveling status of a vehicle in the information processing system disclosed in FIG. 1.
Figure 4:
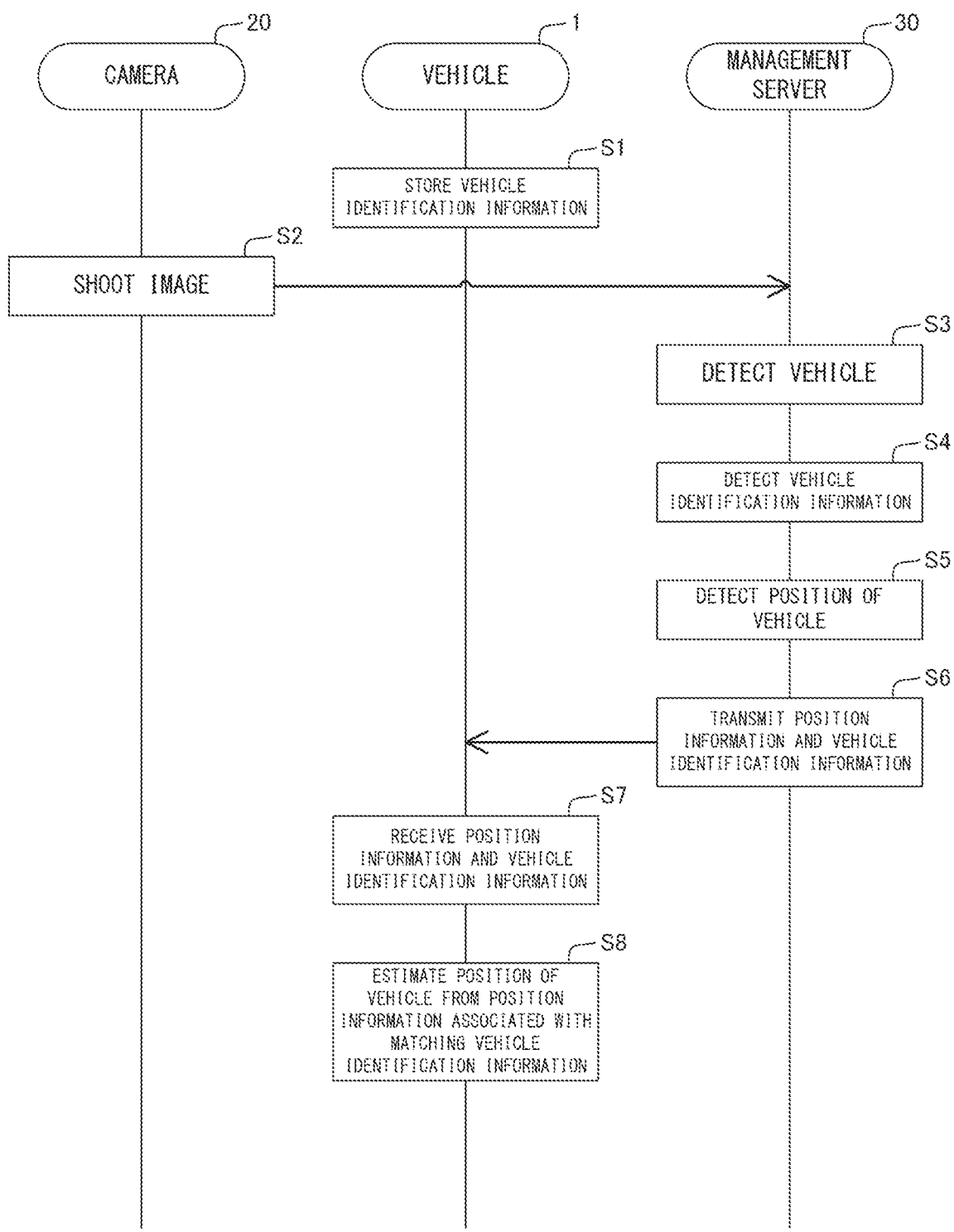
FIG. 4 is a sequence diagram showing the operation of the information processing system disclosed in FIG. 1.

A first example embodiment of the present invention will be described with reference to FIGS. 1 to 4. FIGS. 1 to 2 are diagrams for describing the configuration of an information processing system. FIGS. 3 to 4 are diagrams for describing the operation of the information processing system.

[Configuration]

The information processing system according to the present invention is a system for making a vehicle 1 (a moving object) recognize the position of the vehicle 1 itself. The vehicle 1, in order to convey a package or provide security in a predetermined site such as a factory, autonomously travels on a passage in the site. Therefore, as will be described later, the vehicle 1 has a function of recognizing its own position, and also has a function of determining a traveling route based on its own position having been recognized and autonomously traveling by automatic driving. However, the vehicle 1 is not limited to one that travels autonomously, and may be a moving object that travels by driving operation by a boarding driver or an operator who is in a remote place. For example, the vehicle 1 may be a cart traveling in a predetermined site by a person's operation or an automobile traveling on a general road.

As shown in FIG. 1, the information processing system in this example embodiment includes the vehicle 1, a camera 20, and a management server 30. The respective components will be described in detail below.

A plurality of cameras 20 are each placed beside a passage or on a passage so as to be able to shoot an image of a predetermined area of the passage. For example, the cameras 20 are each placed on a telephone pole, a traffic signal, a guard rail, a fence, and so on, placed beside a passage. Moreover, the cameras 20 are each placed so as to use a partial area of the passage as a shooting range. By combining the imaging ranges of the cameras 20, it becomes possible to shoot an image of the whole area of the passage. To each of the cameras 20, camera identification information related to its placement position or a shooting area of the passage is given, and is stored in a storage unit provided in the camera 20.

The camera 20 acquires a shot image of the passage at a predetermined frame rate under control by an arithmetic logic unit installed therein. Then, the camera 20 transmits the acquired shot image together with camera identification information given to the camera 20 itself to the management server 30 under control by the arithmetic logic unit. The camera 20 is connected to the management server 30 via a wireless communication network or a wired communication network.

The management server 30 is an information processing device including an arithmetic logic unit and a storage unit, and can communicate with an external camera or information processing device via a network. The management server 30 includes an acquiring part 31, a specifying part 32 and a transmitting part 33 that are built by execution of a program by the arithmetic logic unit as shown in FIG. 2. Moreover, the management server 30 includes a passage information storage part 34 formed in the storage unit.

On the passage information storage part 34, a passage image obtained by previously shooting a passage is stored. The passage image is provided with camera identification information of the camera 20 having shot the passage image. Moreover, the passage image is stored associated with position information for each area on the passage image. For example, in a passage image, position information is associated with the shape of a passage and the feature value of an object for each area on the passage image. However, not only the abovementioned passage image but any information for specifying position information of each area on a shot image may be stored on the passage information storage part 34.

The acquiring part 31 (an acquiring unit) acquires a shot image transmitted from each of the cameras 20 as described above. The acquiring part 31 performs image processing on the shot image and detects the vehicle 1 present in the shot image. For example, the acquiring part 31 previously retains information (a feature value such as color and shape) representing a feature on an image of the vehicle 1, and detects the vehicle 1 by confirming whether or not such a feature value is present in the shot image. Furthermore, by performing image processing on an image portion of the detected vehicle 1, the acquiring part 31 detects and acquires vehicle identification information given to the vehicle 1. To be specific, the acquiring part 31 detects vehicle identification information of the vehicle 1 in the following manner.

First, the vehicle 1 is provided with a QR code 1*a* on the outer surface as shown in FIGS. 1 and 2. The acquiring part 31 performs a recognition process on the QR code 1*a* included in an image portion of the outer surface of the vehicle 1 shown in a shot image and thereby detects vehicle identification information assigned to the QR code 1*a*.

However, the acquiring part 31 is not necessarily limited to detecting vehicle identification information by using the QR code 1*a*. For example, the acquiring part 31 may perform a recognition process on an image portion of text information or pattern information given to the outer surface of the vehicle 1 and detect information unique to the text information or the pattern information as vehicle identification information. Alternatively, the acquiring part 31 may perform a recognition process on an image portion of a passenger boarding the vehicle 1 or an object such as a package loaded on the vehicle 1, and detect information unique to the passenger or the object as vehicle identification information.

The specifying part 32 (a specifying unit) performs image processing on a shot image transmitted from each of the cameras 20 and specifies position information representing the position of the vehicle 1 present in the shot image. For example, the specifying part 32 specifies position information of the vehicle 1 based on the shot image showing the vehicle 1 in which the vehicle identification information has been detected by the acquiring part 31 described above, and based on the passage image stored on the passage information storage part 34.

To be specific, the specifying part 32 first extracts camera identification information associated with a shot image from which vehicle identification information has been detected, and acquires a passage image with which identical camera identification information is associated, from the passage image storage part 34. Then, the specifying part 32 extracts the shapes of roads and the features of other objects in the shot image and the passage image, and associates matching areas in images with each other between the shot image and the passage image. After that, the specifying part 32 assigns, as position information of an area in which the vehicle 1 is located in the shot image, position information of the area in the passage image having been associated. However, the specifying part 32 may specify position information representing the position of the vehicle 1 in a shot image by any method.

As described above, the transmitting part 33 (a transmitting unit) transmits vehicle identification information and position information of the vehicle 1 present in a shot image, which have been acquired from the shot image, to the outside in association with each other. In particular, the transmitting part 33 transmits the vehicle identification information and the position information so that the vehicle 1 located in a site where the vehicle 1 can receive from an access point (not shown in the drawings) installed in the site. However, the transmitting part 33 may transmit the vehicle identification information and the position information within a wider range.

Next, the configuration of the vehicle 1 will be described. The vehicle 1 is equipped with a vehicle terminal 10 as shown in FIG. 2. The vehicle terminal 10 is an information processing terminal including an arithmetic logic unit and a storage unit, and can communicate with an external information processing device by wireless communication. The vehicle terminal 10 includes an estimating part 11 built by execution of a program by the arithmetic logic unit. The vehicle terminal 10 also includes an identification information storage unit 12 formed in the storage unit.

The identification information storage part 12 retains vehicle identification information assigned to the QR code 1*a* given to the outer surface of the vehicle 1 as described above. In a case where the QR code 1*a* is not given to the vehicle 1, text information or pattern information given to the outer surface of the vehicle 1, or unique identification information that can be extracted from a passenger or an object boarding the vehicle 1 may be stored as vehicle identification information on the identification information storage part 12.

Upon receiving mutually associated vehicle identification information and position information transmitted from the transmitting part 33 of the management server 30 as described above, the estimating part 11 (an estimating unit) estimates position information representing the position of itself, namely, the vehicle 1 from the above information. To be specific, the estimating part 11 checks whether or not the transmitted vehicle identification information and the vehicle identification information stored on the identification information storage part 12 match and, when they match, estimates the position information associated with the transmitted vehicle identification information as the position of the vehicle 1. The estimating part 11 may estimate the transmitted position information as the position of the vehicle 1 as it is, or may estimate the position of the vehicle 1 by using other information from the transmitted position information.

[Operation]

Next, the operation of the above-described information processing system will be described with reference to FIGS. 3 to 4 mainly. Herein, a case where a plurality of vehicles 1A, 1B and 1C are traveling within a target facility as shown in FIG. 3 will be described as an example.

First, the vehicles 1A, 1B and 1C are provided with the QR codes 1*a*, 1*b* and 1*c* on the outer surfaces, respectively. On the identification information storage part 12 in the vehicle terminal 10 installed in each of the vehicles 1A, 1B and 1C, vehicle identification information assigned to each of the QR codes 1*a*, 1*b* and 1*c* given to the vehicle itself is stored (step S1).

Each of the cameras 20 placed in the target facility acquires a shot image of a passage at predetermined time intervals. Then, the camera 20 transmits the shot image together with camera identification information set in the camera 20 itself to the management server 30 (step S2).

The management server 30, upon acquiring the shot images transmitted from the respective cameras 20, performs image processing on the respective shot images and detects the vehicles 1A, 1B and 1C present in the respective shot images (step S3). Then, by further performing image processing on an image portion of the detected vehicle 1A, 1B, 1C, the management server 30 detects the QR code 1*a*, 1*b*, 1*c* given to the outer surface of the vehicle 1A, 1B, 1C and then detects vehicle identification information assigned to the QR code 1*a*, 1*b*, 1*c* (step S4).

Furthermore, the management server 30 performs image processing on the shot image and specifies position information representing the position of the vehicle 1A, 1B, 1C included in the shot image (step S5). At this time, by comparing the shot image with previously stored passage images, the management server 30 specifies position information of the vehicle 1A, 1B, 1C. For example, the management server 30 first extracts camera identification information associated with the shot image from which the vehicle identification information has been detected, and acquires a passage image with which the same camera identification information is associated from the passage image storage part 34. Then, the management server 30 extracts the shapes of roads or the features of other objects shown in the shot image and the passage image, and associates matching areas in images with each other between the shot image and the passage image. Furthermore, the management server 30 assigns and specifies, as position information of an area where the vehicle 1 is located in the shot image, position information in a passage image associated with the area.

After that, the management server 30 associates the vehicle identification information and position information of the vehicle 1 present in the shot image that have been acquired from the shot image as described above and transmits to the outside (step S6). At this time, the management server 30 transmits the vehicle identification information and the position information to a site where the vehicle 1A, 1B and 1C can travel, so that at least the vehicles 1A, 1B and 1C can receive.

Subsequently, the respective vehicles 1A, 1B and 1C receive the mutually associated vehicle identification information and the position information associated with each other and transmitted from the management server 30 (step S7). Each of the vehicles 1A, 1B and 1C checks whether or not the transmitted vehicle identification information matches the vehicle identification information stored on the identification information storage part 12 of itself. Each of the vehicles 1A, 1B and 1C, in a case where the transmitted vehicle identification information matches the vehicle identification information of the vehicle itself, estimates the position information associated with the transmitted vehicle identification information as the position of the vehicle itself (step S8).

Consequently, in the example of FIG. 3, the vehicle identification information and position information relating to the vehicle 1A, the vehicle identification information and position information relating to the vehicle 1B, and the vehicle identification information and position information relating to the vehicle 1C are transmitted from the management server 30 into a target site. Therefore, each of the vehicles 1A, 1B and 1C receives not only the information relating to itself but also the information relating to the other vehicles. However, because the vehicle identification information is included in the information transmitted from the management server 30, each of the vehicles 1A, 1B and 1C can specify the information of itself from among the transmitted information and estimate only the position information associated with the information of itself as its own position. For example, the vehicle 1A receives the vehicle identification information and position information of all the vehicles 1A, 1B and 1C from the management server 30, but the vehicle 1A can specify only the vehicle identification information and position information relating to the vehicle 1A that is itself, and can properly estimate its own position.

After that, each of the vehicles 1A, 1B and 1C may autonomously travel on a passage by using its own position having been estimated, or may notify an operator of its own position having been estimated.

According to the above-described information processing system, each of the vehicles 1A, 1B and 1C estimates its own position, so that there is no need to mount a camera, a sensor or the like on itself, and it is possible to reduce the equipment cost and more accurately specify its position.

Although information unique to the QR code 1*a* given to the outer surface of the vehicle 1 is used as vehicle identification information, other information may be used as vehicle identification information of the vehicle 1. For example, information unique to text information or pattern information given to the outer surface of the vehicle 1 in advance may be used as vehicle identification information, or information unique to a passenger boarding the vehicle 1 or an object such as a package loaded on the vehicle 1 may be used as vehicle identification information.

Second Example Embodiment

Figure 5:
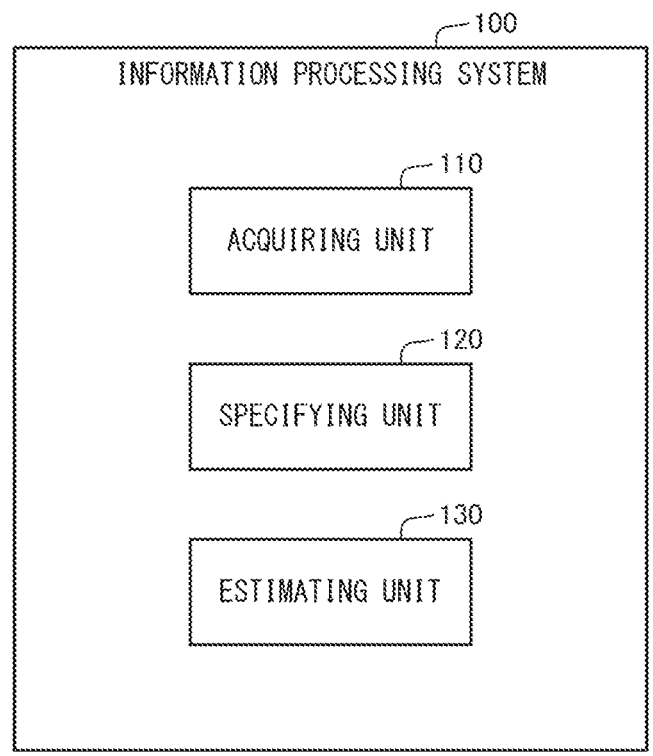
FIG. 5 is a block diagram showing the configuration of an information processing system in a second example embodiment of the present invention.
Figure 6:
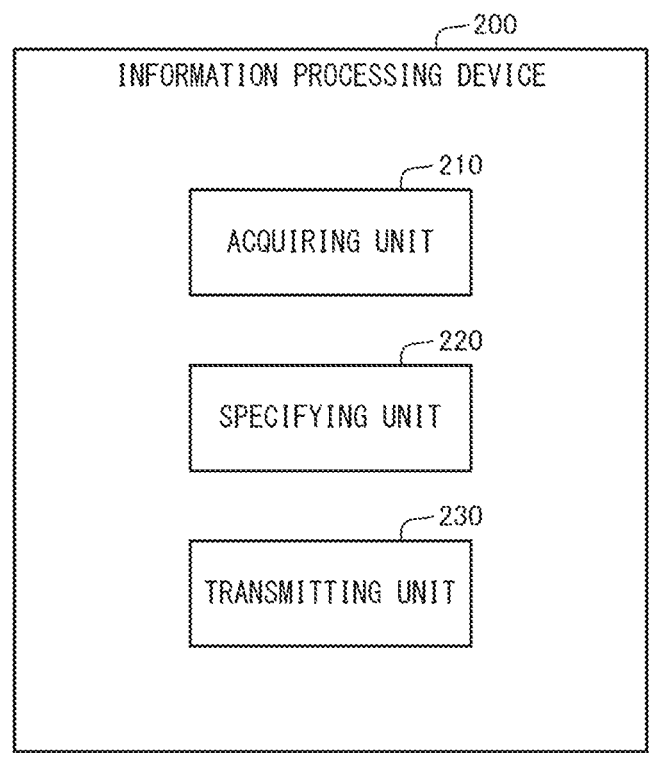
FIG. 6 is a block diagram showing the configuration of an information processing device in the second example embodiment of the present invention.

Next, a second example embodiment of the present invention will be described with reference to FIGS. 5 to 6. FIG. 5 is a block diagram showing the configuration of an information processing system in the second example embodiment. FIG. 6 is a block diagram showing the configuration of an information processing device in the second example embodiment. In this example embodiment, the configurations of the information processing system and the management server 30 described in the first example embodiment are schematically shown.

As shown in FIG. 5, an information processing system 100 in this example embodiment includes: an acquiring unit 110 configured to acquire identification information for identifying a moving object present in a shot image based on the shot image; a specifying unit 120 configured to specify position information representing a position of the moving object present in the shot image based on the shot image; and an estimating unit 130 configured to estimate a position of the moving object based on the identification information and the position information.

Further, as shown in FIG. 6, an information processing device 200 configuring part of the information processing system 100 includes: an acquiring unit 210 configured to acquire identification information for identifying a moving object present in a shot image based on the shot image; a specifying unit 220 configured to specify position information representing a position of the moving object present in the shot image based on the shot image; and a transmitting unit 230 configured to transmit the acquired identification information and the specified position information to surroundings in association with each other so that the moving object can receive.

The respective units 110, 120, 130, 210, 220 and 230 mentioned above may be built by execution of a program by an arithmetic logic unit, or may be built by an electronic circuit.

Then, in the information processing system 100 and the information processing device 200 having the above configurations: the information processing device operates so as to perform a process of, based on a shot image, acquiring identification information for identifying a moving object present in the shot image, and specifying position information representing a position of the moving object present in the shot image; and the moving object operates so as to perform a process of estimating a position of the moving object based on the identification information and the position information.

With the above configurations, a moving object does not need to be equipped with a camera, a sensor or the like for estimating the position of the moving object itself, so that it is possible to reduce the equipment cost and more accurately specify the position of the moving object itself.

<Supplementary Notes>

The whole or part of the example embodiments disclosed above can be described as the following supplementary notes. The configurations of an information processing system, an information processing device, a program and an information processing method according to the present invention will be schematically described below. However, the present invention is not limited to the following configurations.

(Supplementary Note 1)

An information processing system comprising:

an acquiring unit configured to acquire identification information for identifying a moving object present in a shot image based on the shot image;

a specifying unit configured to specify position information representing a position of the moving object present in the shot image based on the shot image; and an estimating unit configured to estimate a position of the moving object based on the identification information and the position information.

(Supplementary Note 2)

The information processing system according to Supplementary Note 1, wherein the acquiring unit is configured to acquire the identification information based on an image portion of the moving object present in the shot image.

(Supplementary Note 3)

The information processing system according to Supplementary Note 2, wherein the acquiring unit is configured to acquire the identification information based on an image portion on an outer surface of the moving object present in the shot image.

(Supplementary Note 4)

The information processing system according to Supplementary Note 2, wherein the acquiring unit is configured to acquire the identification information based on an image portion of an object mounted on the moving object present in the shot image.

(Supplementary Note 5)

The information processing system according to any of Supplementary Notes 1 to 4, comprising a transmitting unit configured to transmit the acquired identification information and the specified position information outside in association with each other.

(Supplementary Note 6)

The information processing system according to Supplementary Note 5, wherein:

the moving object includes the estimating unit; and the estimating unit is configured to estimate a position of the moving object based on the position information associated with the transmitted identification information that is identical to the identification information given to the moving object itself.

(Supplementary Note 7)

An information processing device comprising:

an acquiring unit configured to acquire identification information for identifying a moving object present in a shot image based on the shot image;

a specifying unit configured to specify position information representing a position of the moving object present in the shot image based on the shot image; and a transmitting unit configured to transmit the acquired identification information and the specified position information to surroundings in association with each other so that the moving object can receive.

(Supplementary Note 8)

A non-transitory computer-readable medium for storing a program comprising instructions for causing an information processing device to realize:

an acquiring unit configured to acquire identification information for identifying a moving object present in a shot image based on the shot image;

a specifying unit configured to specify position information representing a position of the moving object present in the shot image based on the shot image; and a transmitting unit configured to transmit the acquired identification information and the specified position information to surroundings in association with each other so that the moving object can receive.

(Supplementary Note 9)

An information processing method comprising:

in an information processing device, based on a shot image, acquiring identification information for identifying a moving object present in the shot image, and specifying position information representing a position of the moving object present in the shot image; and in the moving object, estimating a position of the moving object based on the identification information and the position information.

(Supplementary Note 10)

The information processing method according to Supplementary Note 9, wherein:

the information processing device transmits the acquired identification information and the specified position information to surroundings in association with each other; and the moving object estimates a position of the moving object based on the position information associated with the transmitted identification information that is identical to the identification information given to the moving object itself.

The abovementioned program is stored in a storage unit or recorded on a computer-readable recording medium. For example, the recording medium is a portable medium such as a flexible disk, an optical disk, a magneto-optical disk and a semiconductor memory.

Although the present invention has been described above with reference to the example embodiments and so on, the present invention is not limited to the above example embodiments. The configurations and details of the present invention can be changed in various manners that can be understood by one skilled in the art within the scope of the present invention.

EXPLANATION OF REFERENCE NUMERALS 1, 1A, 1B, 1C vehicle
1a, 1b, 1c QR code
10 vehicle terminal
11 estimating part
12 identification information storage part
20 camera
30 management server
31 acquiring part
32 specifying part
33 transmitting part
34 passage information storage part
100 information processing system
110 acquiring unit
120 specifying unit
130 estimating unit
200 information processing device
210 acquiring unit
220 specifying unit
230 transmitting unit

The invention claimed is:

1. An information processing system comprising:
a memory storing instructions; and
at least one processor configured to execute the instructions to:
acquire identification information for identifying a moving object present in a shot image based on the shot image;
specify position information representing a position of the moving object present in the shot image based on the shot image; and
estimate a position of the moving object based on the identification information and the position information.

2. The information processing system according to claim 1, wherein the at least one processor is further configured to execute the instructions to acquire the identification information based on an image portion of the moving object present in the shot image.

3. The information processing system according to claim 2, wherein the at least one processor is further configured to execute the instructions to acquire the identification information based on an image portion on an outer surface of the moving object present in the shot image.

4. The information processing system according to claim 2, wherein the at least one processor is further configured to execute the instructions to acquire the identification information based on an image portion of an object mounted on the moving object present in the shot image.

5. The information processing system according to claim 1, wherein the at least one processor is further configured to execute the instructions to transmit the acquired identification information and the specified position information outside in association with each other.

6. The information processing system according to claim 5, wherein: the at least one processor is further configured to execute the instructions to estimate a position of the moving object based on the position information associated with the transmitted identification information that is identical to the identification information given to the moving object itself.

7. An information processing device comprising:
a memory storing instructions; and
at least one processor configured to execute the instructions to:
acquire identification information for identifying a moving object present in a shot image based on the shot image;
specify position information representing a position of the moving object present in the shot image based on the shot image; and
transmit the acquired identification information and the specified position information to surroundings in association with each other so that the moving object can receive.

8. An information processing method comprising:
in an information processing device, based on a shot image, acquiring identification information for identifying a moving object present in the shot image, and specifying position information representing a position of the moving object present in the shot image; and
in the moving object, estimating a position of the moving object based on the identification information and the position information.

9. The information processing method according to claim 8, wherein:
the information processing device transmits the acquired identification information and the specified position information to surroundings in association with each other; and
the moving object estimates a position of the moving object based on the position information associated with the transmitted identification information that is identical to the identification information given to the moving object itself.

10. The information processing method according to claim 8, wherein the information processing device acquires the identification information based on an image portion of the moving object present in the shot image.

11. The information processing method according to claim 10, wherein the information processing device acquires the identification information based on an image portion on an outer surface of the moving object present in the shot image.

12. The information processing method according to claim 10, wherein the information processing device acquires the identification information based on an image portion on an outer surface of the moving object present in the shot image.

* * * * *